US005580625A

United States Patent [19]

Capy et al.

[11] Patent Number: 5,580,625

[45] Date of Patent: *Dec. 3, 1996

[54] PLEATED WRAPPER

[75] Inventors: Gilbert Capy; Akiva Buchberg, both of Jarnioux, France

[73] Assignee: Wrapco International B.V., Rotterdam, Netherlands

[ * ] Notice: The term of this patent shall not extend beyond the expiration date of Pat. No. 5,131,586.

[21] Appl. No.: 239,756

[22] Filed: May 9, 1994

Related U.S. Application Data

[62] Division of Ser. No. 885,953, May 19, 1992.

[51] Int. Cl.$^{6}$ .................................................... B29D 22/00

[52] U.S. Cl. ....................... 428/35.2; 428/35.4; 428/35.5; 229/87.03; 229/87.08

[58] Field of Search ................................ 428/35.2, 35.4, 428/35.5; 229/87.03, 87.08, DIG. 3, DIG. 9

[56] References Cited

U.S. PATENT DOCUMENTS

| | | | |
|---|---|---|---|
| 4,795,648 | 1/1989 | Capy et al. | 426/111 |
| 4,925,711 | 5/1990 | Akao et al. | 428/35.2 |
| 5,006,380 | 4/1991 | Fraser | 428/35.2 |
| 5,125,564 | 6/1992 | Capy | 229/87.03 |
| 5,131,586 | 7/1992 | Capy | 229/87.03 |

*Primary Examiner*—James J. Seidleck
*Assistant Examiner*—Michael A. Williamson
*Attorney, Agent, or Firm*—Kane, Dalsimer, Sullivan, Kurucz, Levy, Eisele and Richard, LLP

[57] ABSTRACT

A receptacle for various objects including food stuff is formed from a pleated sheet folded over itself to form a pouch with a mouth. The volume of the pouch may be expanded by pulling its corners apart, urging the sides of the pouch mouth together. In another variation, the pouch is formed of one section and a folded pleated section is deployed about the first section to form a cap.

9 Claims, 7 Drawing Sheets

PLEATED WRAPPER

This is a divisional of copending application Ser. No. 07/885,953, filed on May 19, 1992.

RELATED APPLICATIONS

The subject matter of this application is related to U.S. Pat. No. 4,795,648 as well as the following applications:

U.S. Ser. No. 606,109, filed on Oct. 31, 1990 titled SANDWICH WRAPPER, abandoned in favor of U.S. Ser. No. 136,188 filed on Oct. 7, 1993;

U.S. Ser. No. 687,381, filed on Apr. 18, 1991 titled PLEATED PACKAGING WRAPPER FOR OBJECTS, now U.S. Pat. No. 5,125,564 issued Jun. 30, 1992;

U.S. Ser. No. 687,384, filed on Apr. 18, 1991 titled CONTINUOUS SHEET PLEATING DEVICE FOR MAKING OVERLAPPING PLEATS AND ARRANGEMENTS, now U.S. Pat. No. 5,188,265 issued Feb. 23, 1993;

U.S. Ser. No. 702,265, filed on May 17, 1991 titled IMPROVED PLEATED PACKAGING WRAPPER AND METHOD OF WRAPPING OBJECTS USING THE SAME, now U.S. Pat. No. 5,131,586 issued Jul. 21, 1992;

U.S. Ser. No. 752,866, filed on Aug. 30, 1991 titled A PROCESS AND APPARATUS FOR MAKING A WRAPPING FROM A THIN PLEATED SHEET, now U.S. Pat. No. 5,201,697 issued Apr. 13, 1993.

BACKGROUND OF THE INVENTION

1. Field of the Invention This invention pertains to an improved pleated wrapper, and more particularly to a wrapper made of a pleated or partially thin sheet of material folded on itself.

2. Description of the Prior Art

U.S. Pat. No. 4,795,648 describes a wrapper for various complex objects, formed of a thin pleated sheet of material. The wrapper can be deployed around an object to form a self-closing package. In the other applications mentioned above, improvements to this wrapper and devices for making the pleated sheet are described. One problem with the wrappers so far has been that they are more suited for objects having stable or relatively fixed outlines, but are unsuited for several objects or food stuff arranged in a random configuration, such as for example, french fries or chicken nuggets. In application Ser. No. 702,265 an attempt has been made to alleviate this problem by suggesting a wrapper formed of a thin pleated sheet attached to an unpleated sheet made of a rigid, thicker material. Of course, this wrapper is made difficult to make and handle since it is made of two different types of materials.

OBJECTIVES AND SUMMARY OF THE INVENTION

In view of the above-mentioned disadvantages of the prior art, it is an objective of the present invention to provide a wrapper made suitable for one or more objects, particularly food-stuff, having an indeterminate shape.

A further objective is to provide a wrapper made of a thin, flexible and inexpensive sheet.

Yet another objective is to provide a wrapper having a mouth which closes naturally as the wrapper is expanded to provide thermal protection. Other objectives and advantages of the invention shall become apparent from the following description.

A wrapper made in accordance with this invention is formed of a thin sheet of pleated material which is folded over itself transversely with respect to the pleats to form a pouch, with the pleatings extending longitudinally along the pouch sidewalls. After the pouch is filled with objects, such as french fries, chicken nuggets, etc., the two lower corners may be extended to form a closed container. In an alternate embodiment, a pleated portion of the sheet deployed is around a pouch.

DETAILED DESCRIPTION OF THE INVENTION

The subject invention pertains to a receptacle or container formed of a pleated sheet, said pleated sheet being formed by unsymmetrical pleats defined by preferably parallel folds. As shown in FIG. 1A, a typical pleated sheet 100 is formed of two sections, 100A, 100B, having widths A and B, respectively, with width A being larger than width B. The two edges of the sheet perpendicular to the pleats are fixed, by using an adhesive material or tape. This type of pleated sheet is disclosed in U.S. Pat. No. 4,795,648. In U.S. Pat. No. 4,795,648, a wrapper is made from a simple thin sheet having a planar rectangular shape.

Figure 1:
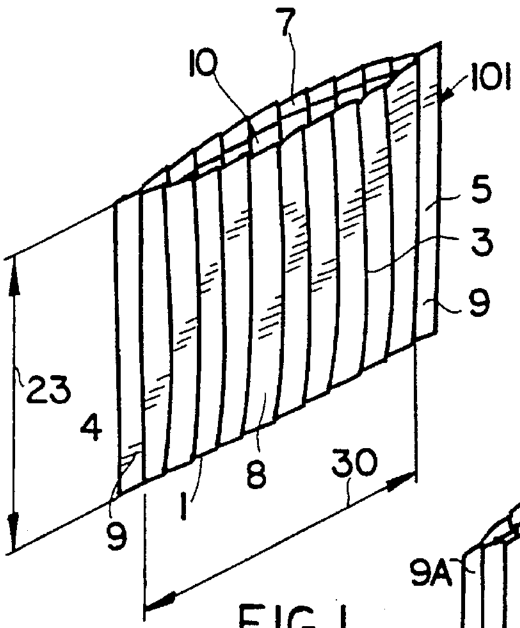
FIG. 1 shows an isometric view of a pouch constructed in accordance with this invention.
Figure 1A:
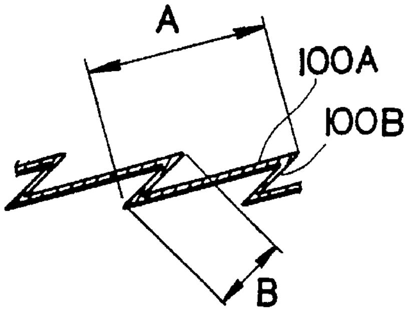
FIG. 1A shows cross-sectional view of a pleated sheet used in the subject invention.

In the first embodiment of the FIG. 1, a pleated sheet 101 similar to sheet 100 in FIG. 1A is used which has been folded over itself along a fold 1 perpendicular to the pleats 3. The two opposed edges 4, 5 of the sheet are then glued, soldered or otherwise affixed to each other to form a pouch with two sides, a closed base 8 and an open mouth 10. Along the open mouth 10, the pleats 3 have a fixation zone 7 for fixing the pleats as described above.

Figure 3:
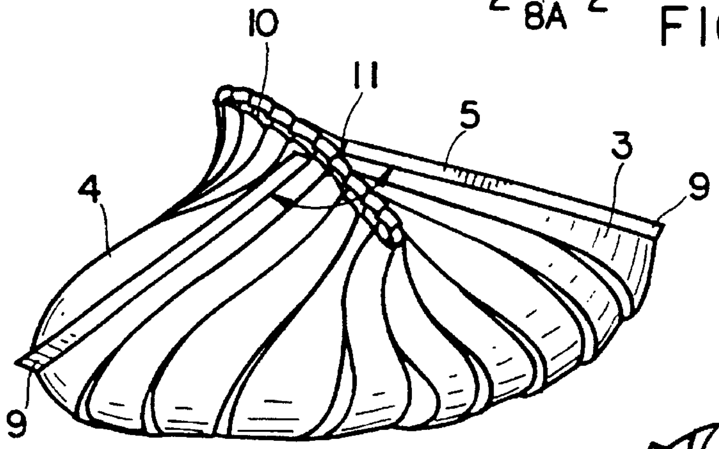
FIG. 3 shows the pouch of FIG. 1 in a closed configuration.
Figure 5:
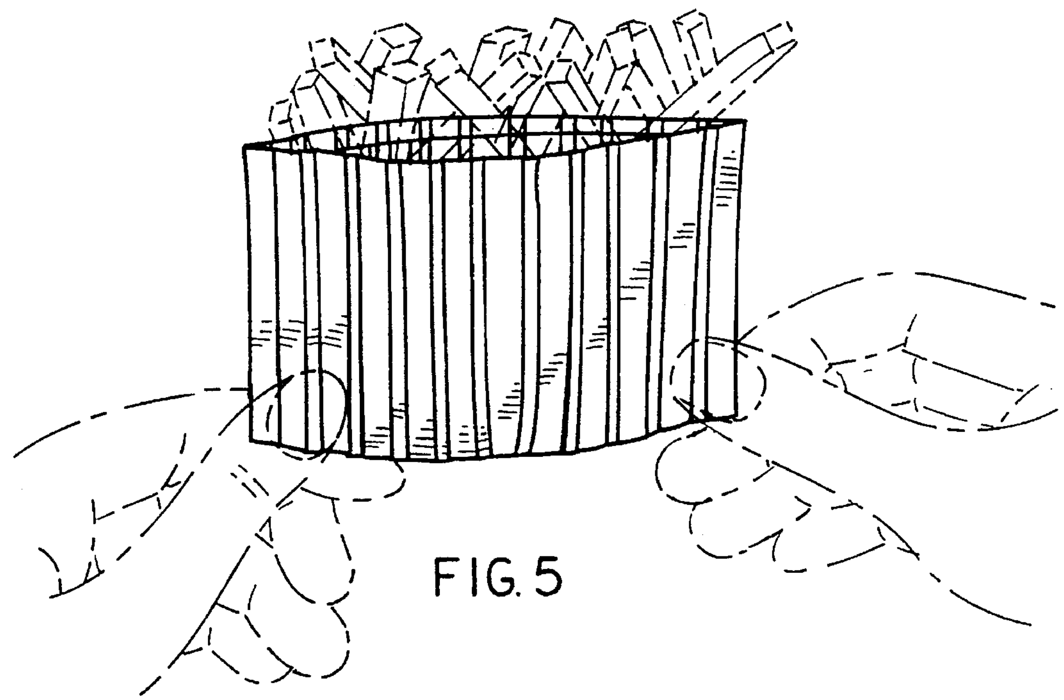
FIGS. 5 and 6 show the pouch of FIG. 1 filled with french fries in the open and closed configurations.
Figure 6:
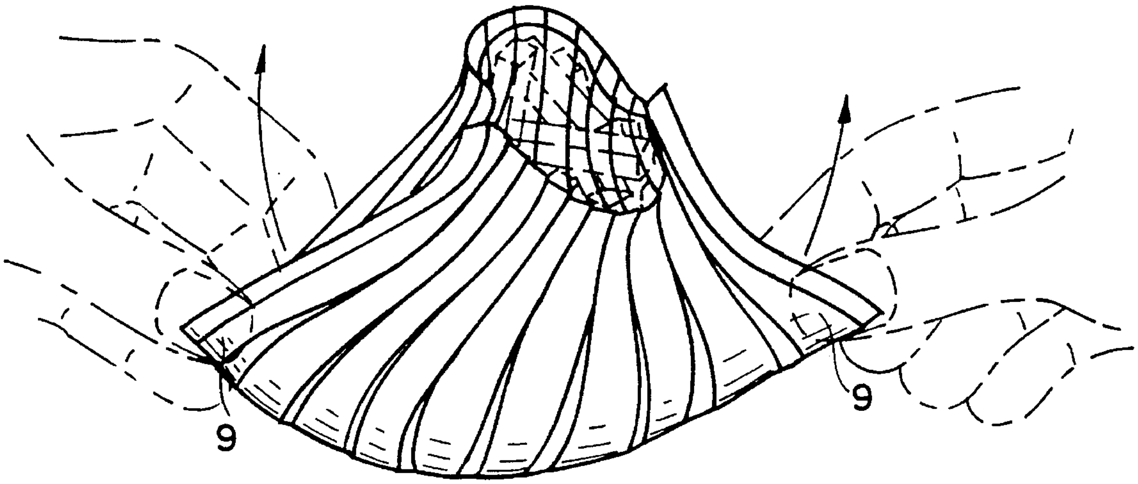

Sheet 101 may be formed for example, from paper coated with a plastic material such as polyethylene. Importantly, the pouch of FIG. 1 could be deployed into one of two configurations. In one configuration the two corners 9 can be pulled apart to expand base 8 to form a roughly semicircular shape as shown. Importantly, the sidewalls of the pouch are urged together to close mouth 10, as shown in FIG. 3. Therefore the pouch may be placed on a straight surface on its side without spilling its contents. Moreover, the interior of the pouch will be substantially closed to insure that its contents do not cool off. However, sufficient space remains between the sidewalls to allow some ventilation. FIGS. 5 and 6 indicate the use of this pouch, such as for storing french fries. Importantly, the french fries are first introduced through the mouth 10. During this step, the fingers of the operator are protected from by being burned (if the french fries are too hot) by the sidewalls of the pouch. The thickness of the sidewalls depends on the ratio A/B. If this ratio is less than 2, then the pouch sidewalls consists of between one and three layers. If this ratio is greater than 2, then the several pleats overlap so that the walls consists of three to five layers.

Once the pouch is filled, its two corners 9 may be pulled apart causing the pleats 3 to expand along the bottom 8. The expansion of the pleats increases the volume of the pouch allowing the french fries to settle inside, as shown in FIG. 6. The mouth of the pouch also closes for heat protection.

The ratio A/B also controls the size and shape of the pouch in the open configuration. If A/B>2, the interior angle between sides 4 and 5 is less than 180°.

Figure 4:
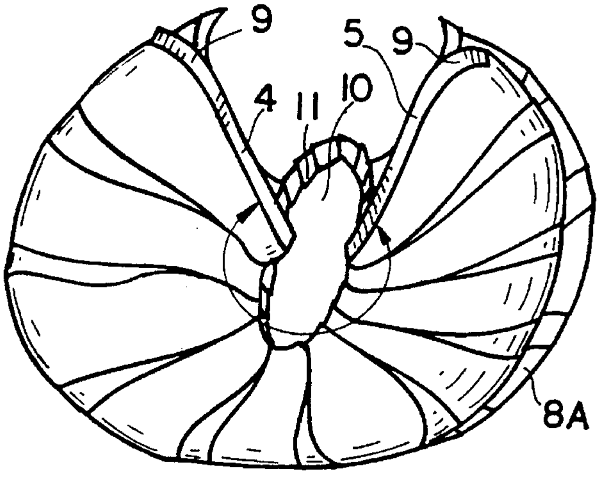
FIG. 4 shows an alternate closed configuration for the pouch of FIG. 1.

If the ratio A/B is smaller, for example 1.5, and if the width and length of the pouch (29, 30) remain approximately equal, then the angle between sides and 4 and 5 as the pouch is deployed, increased exceeds 180° substantially, as shown in FIG. 4. However, the mouth 10 remains closed by the biasing of the pouch sides thereby insuring the contents of the pouch do not spill. Of course, a consumer can easily insert his fingers through opening 10 and retract to withdraw the french fries at will.

Figure 2:
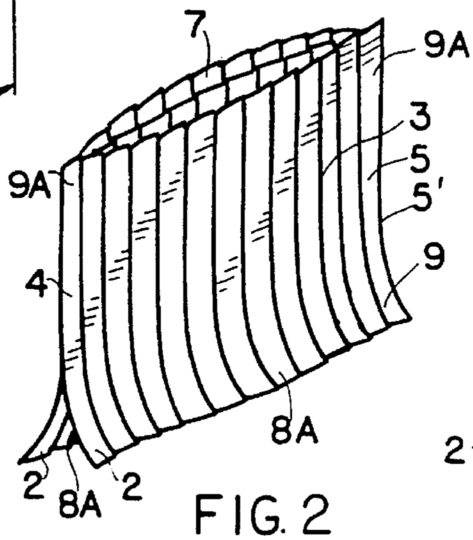
FIG. 2 shows an isometric view of another embodiment of the pouch of FIG. 1.
Figure 2A:
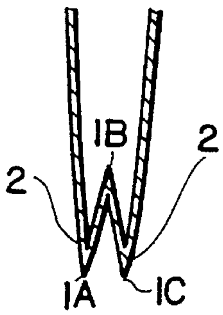
FIG. 2A shows a cross-sectional view of the pouch of FIG. 2.
Figure 6A:
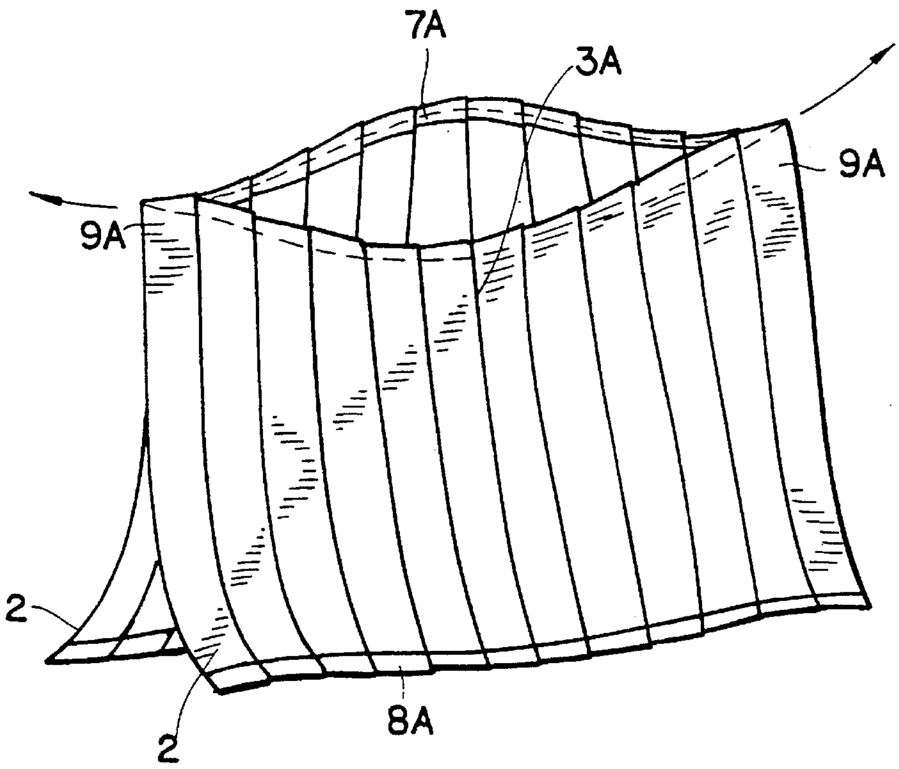
FIGS. 6A and 6B show another method of opening the pouch of FIG. 2 to form a serving basket.
Figure 6B:
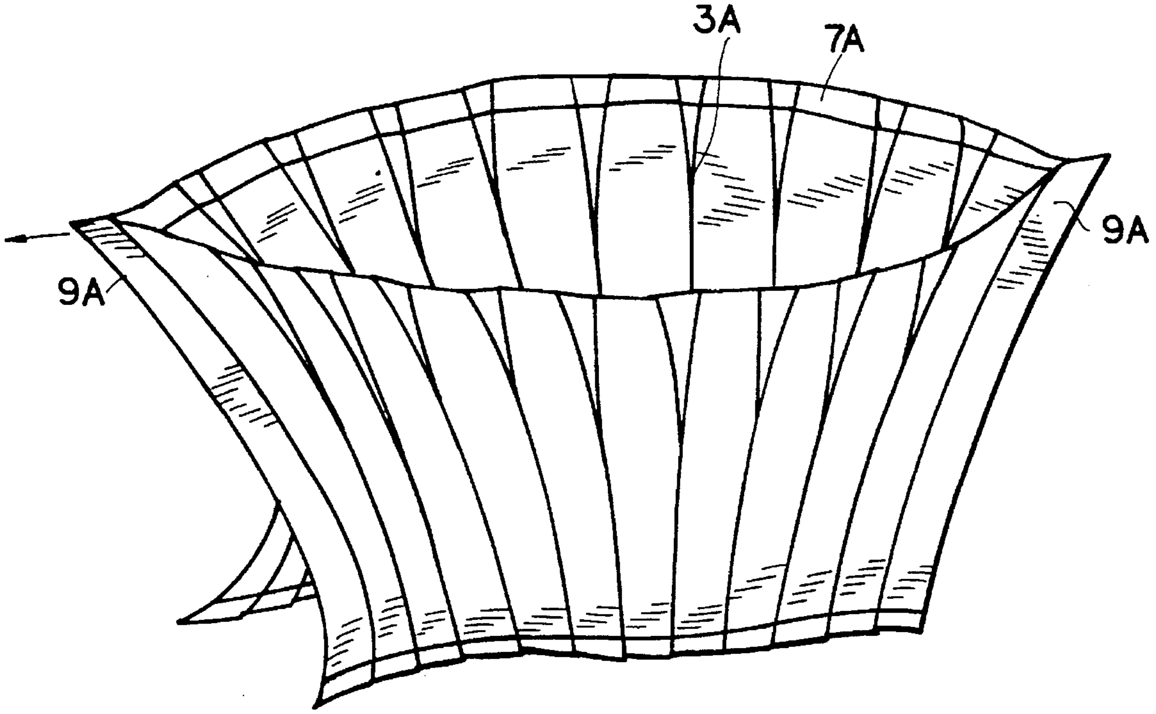

FIG. 2 shows a pouch similar to the one in FIG. 1, except that its bottom 2 is formed by folding sheet 101 three times as shown at 1A, 1B and 1C to form a gusseted flap 8A. The advantage of this embodiment is that when corners 9 are extended or pulled sideways to close the pouch, the flap 8A comes out and forms a relatively straight bottom surface for holding the pouch in upright position (as seen in FIG. 4). In this configuration, the pouch with its contents remains stable. For consumption, the pouch may be opened slightly, by ripping the sidewalls if necessary to provide an easier opening. Obviously, the pouch of FIGS. 1 and 2 may be formed in other ways as well. In FIG. 6A an alternate method of opening the pouch of FIG. 2 is shown. For this method, the pleats 3A are fixed in zone 7A by a weak adhesive. The pleats are also fixed at the bottom along pleating zone 8A. The pouch is filled up and closed in the same manner as shown in FIGS. 5 and 6. However, prior to consumption, the pouch is opened up by pulling the upper corners 9A apart. This action causes the pleats to open in zone 7A thereby allowing the pouch to open and form a serving basket.

Figure 7:
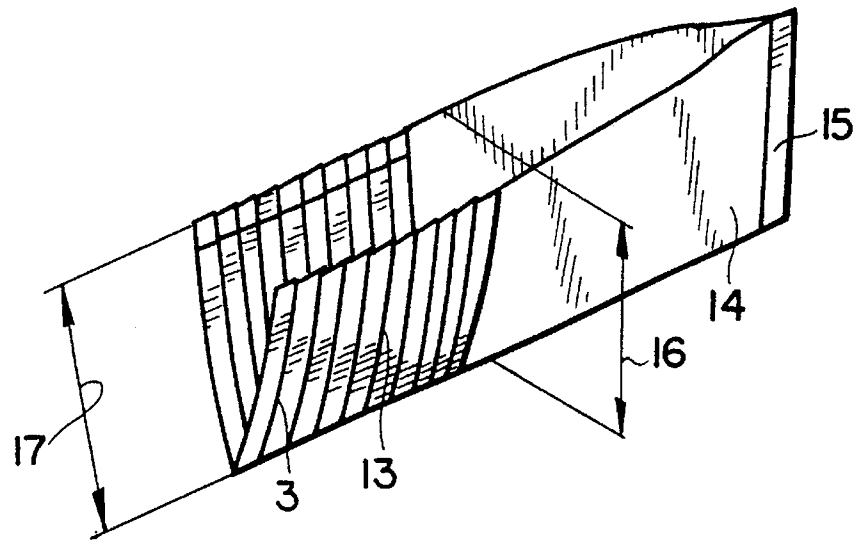
FIGS. 7, 8 and 9 show another embodiment of the invention in the pleated and closed configuration and opened configuration after use.
Figure 8:
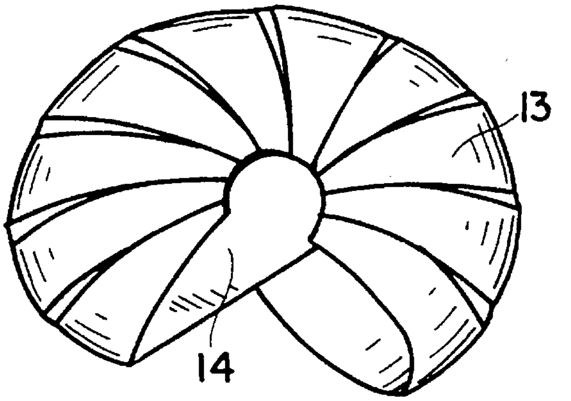

In the embodiment shown in FIG. 7 a sheet is shown having a pleated and an unpleated section (13, 14). The sheet is folded in two along a line perpendicular to the pleats 3, and the edges 15 of the unpleated section is fixed to form a partial pouch.

Figure 9:
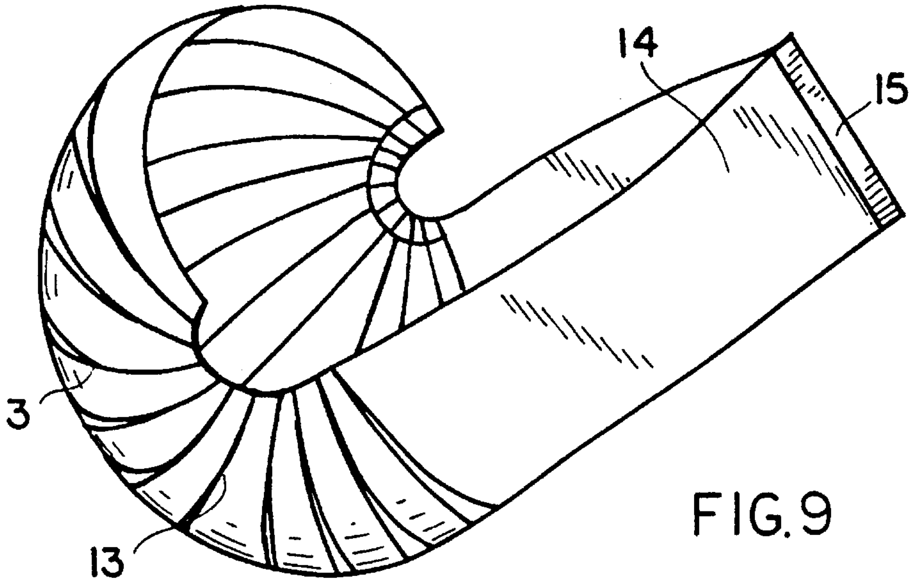

A product is placed in the partial pouch and the pleated section is then deployed around the partial pouch. The shape of the pleated section again depends on height 17, and length of the pleated section as well as ratio A/B. If desired, the height 16 of unpleated section 13 may be different then height 17. One advantage of this configuration is that in order to consume the product within the pouch, the pleated section need be opened only partially, as indicated in FIG. 9.

Figure 10:
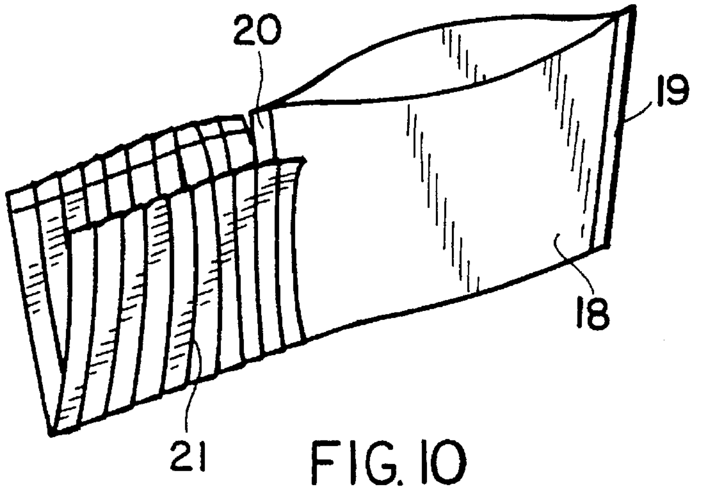
FIG. 10 shows yet another embodiment of the invention in the open configuration.

In a variation shown in FIG. 10, both edges 19, 20 of an unpleated section 18 are fixed to form a pouch which is then covered at will by the pleated section 21.

Figure 11:
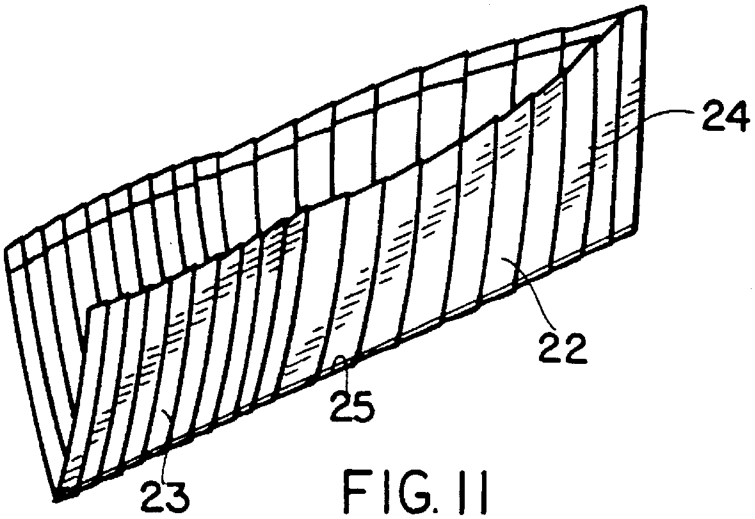
FIGS. 11 and 12 show yet another embodiment of the invention in the opened and closed configurations.

In another variation of the invention shown in FIG. 11, non-pleated section 14 of FIG. 7 is replaced by a pleated section 22, having pleats fixed along one side 24 along one side 25A, and along bottom 25. Pleated section 23 is attached to section 22 as shown. The two sections 22, 23 may be made of different materials. For example, section 24 may be made for example of a thermally insulated material, set into a pouch-shaped formed by one or more fixation lines 25. Alternatively, pleated section 22 may be made with more overlapping pleats than section 23 to provide more thermal insulation. In this manner, an opened and closed pouch may be forced as shown in FIGS. 11 and 12 which is thermally insulated.

Figure 12:
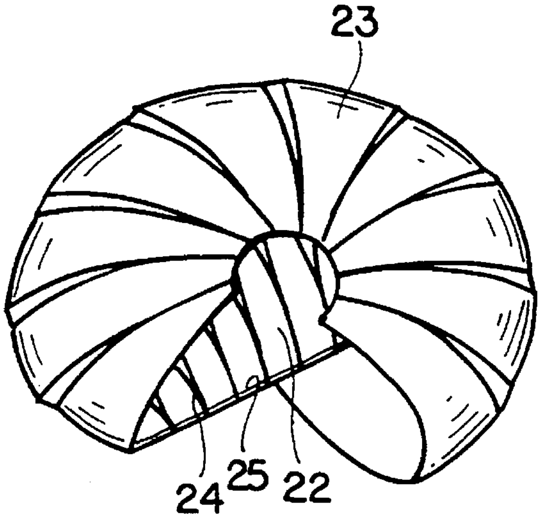

In the embodiment of FIGS. 11 and 12, pleats of section 22 are fixed both at the top and bottom so that they do not open as the section 23 is deployed around section 22.

Figure 13:
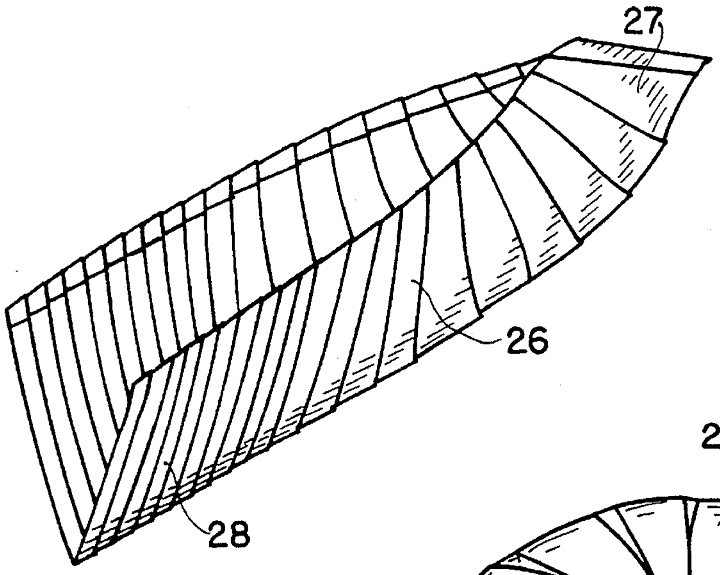
FIGS. 13 and 14 show yet another embodiment of the invention in the open and closed configurations and FIG. 15 show another embodiment suitable for popcorn.
Figure 14:
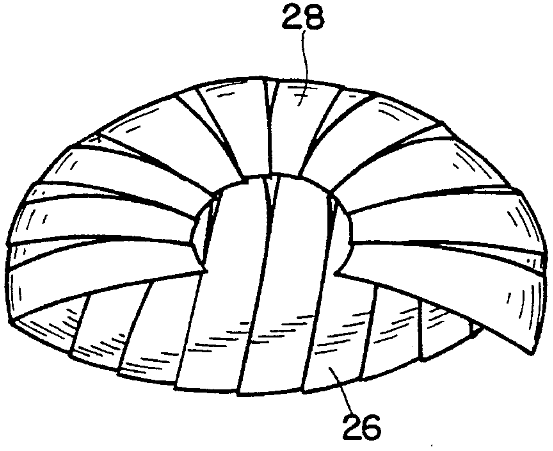

In the embodiment of FIGS. 13 and 14, section 26 is formed in such a manner that the pleats can be opened at least partially to form a double based package as shown in FIG. 14. Advantageously, the border 27 of section 26 is formed at an angle to allow the section 28 to be wrapped around section 26 more tightly.

Figure 15:
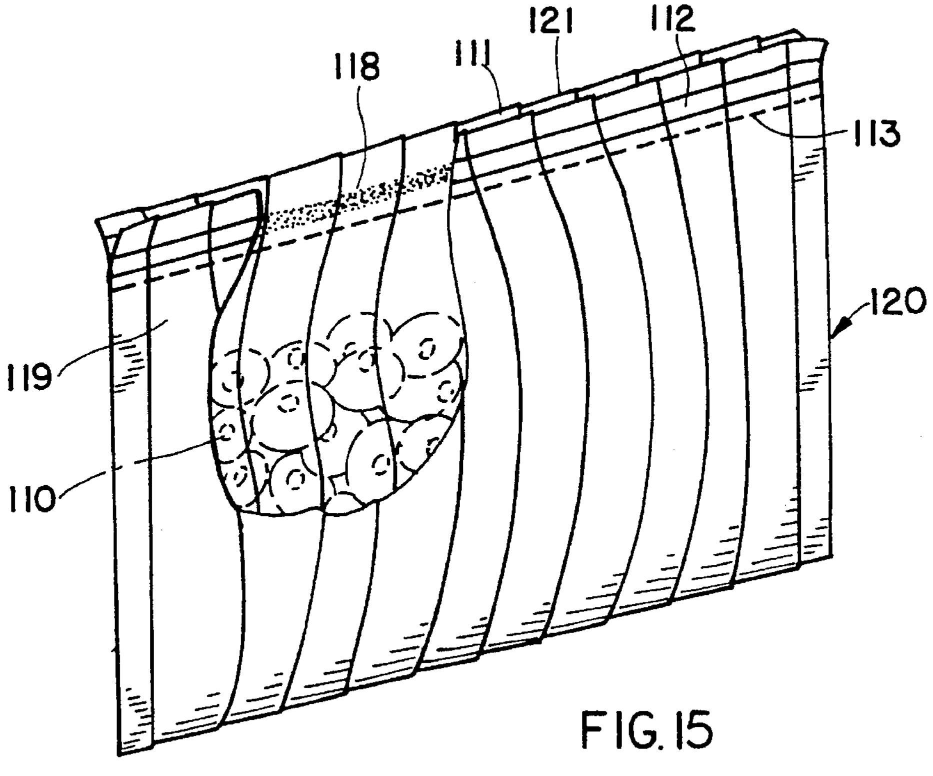
Figure 16:
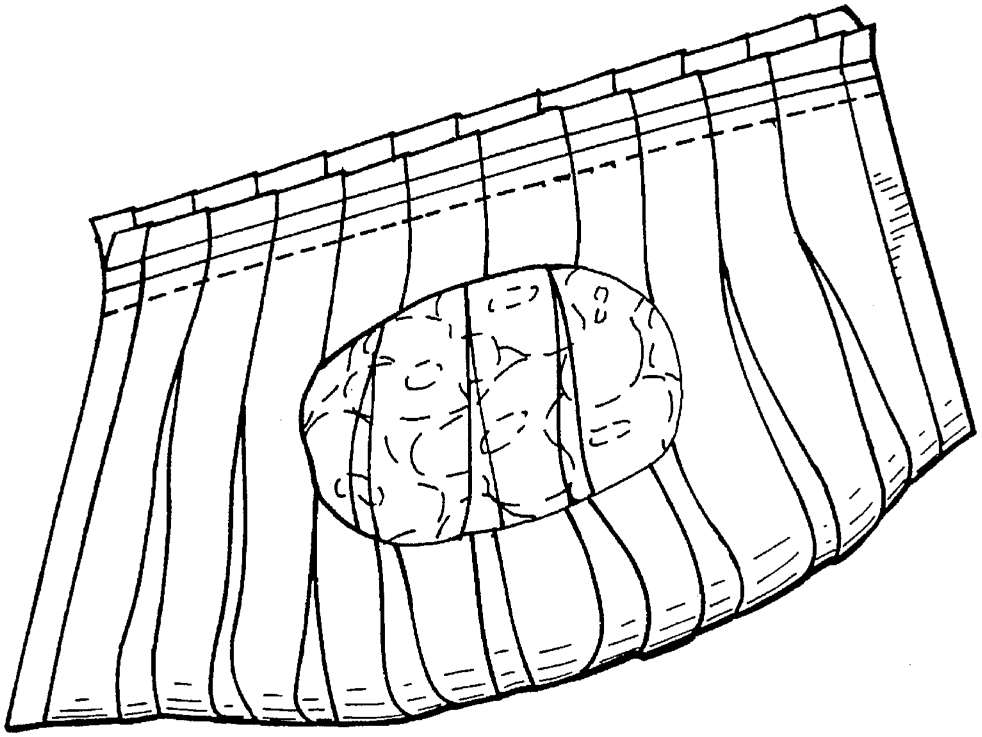
FIG. 16 shows the embodiment of FIG. 15 after the popcorn has been popped.
Figure 17:
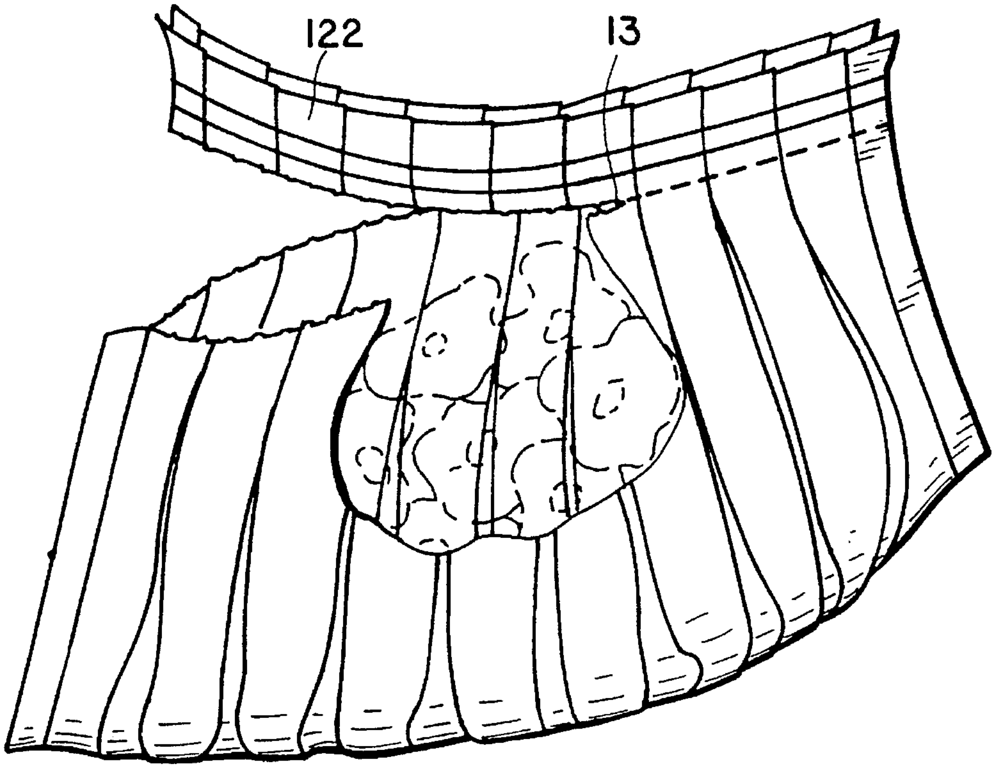
FIG. 17 show the bag of FIG. 16 as it is opened.

In FIGS. 15–17 an embodiment of the invention is shown which is suitable for microwave pop-corn. In this embodiment, a pouch 120 similar to the pouch in FIG. 1 is provided. This pouch is provided with an adhesive strip 112 at mouth 111 of the pouch along one or both inner surfaces of sidewalls 118, 119. Under this adhesive strip, sidewalls 118, 119 are provided with a plurality of partial cuts 113 extending in line in a parallel with edge 121.

The pouch 120 is used as follows. First, special corn kernels 110 are placed into pouch 120 as shown in FIG. 15, after which the pouch is sealed with adhesive strip 112. The pouch filled with the corn kernels are then shipped to stores for sale to customers.

For consumption, a customer takes a pouch with the corn and places it into a microwave oven so that the corn kernels can be subjected to heat for popping. During this process the popped corn forces the pouch to expand by opening its pleats as shown in FIG. 16. After the pouch is removed from the microwave oven, it is opened by separating its top 122 along the cuts 113 as shown in FIG. 17.

Obviously numerous modifications may be made to this invention without departing from its scope as defined in the appended claims.

We claim:

1. A receptacle and a cover for holding and enclosing several loose objects comprising:

a first section forming a pouch for objects and having a first section side and a closed side, said pouch being defined by two opposed faces affixed to each other along an edge defining a bottom whereby several loose objects can be placed in the pouch; and a second section formed of a pleated sheet having generally parallel pleats folded over itself transversely with respect to the pleats and having a second section side fixed to said first section side, said second section being arranged and constructed to be moved towards said pouch to form a closure for covering said pouch when said pleats are opened and said closure being movable away from the pouch in order to allow access to said loose objects in said pouch.

2. The receptacle and the cover of claim 1 wherein said second section is deployed around said first section to form a generally circular cap.

3. The receptacle and the cover of claim 1 wherein said first section is formed of a first section sheet folded over itself.

4. The receptacle and the cover of claim 2 wherein said first section sheet is pleated.

5. The receptacle and the cover of claim 2 wherein said first section sheet is unpleated.

6. The receptacle and the cover of claim 2 wherein said first section sheet has two closed sides.

7. The receptacle and the cover of claim 2 wherein said receptacle has an open side affixed to said second section.

8. The receptacle and the cover of claim 2 wherein said first section sheet is formed with pleats and a bottom, said pleats being fixed at said bottom.

9. The receptacle and the cover of claim 2 wherein the second section is folded over itself to define two opposed faces affixed to each other along an edge defining a bottom.

* * * * *